US008088871B2

(12) United States Patent
Muruganandam et al.

(10) Patent No.: US 8,088,871 B2
(45) Date of Patent: Jan. 3, 2012

(54) CATALYST SYSTEMS AND POLYMERIZATION PROCESSES

(75) Inventors: Natarajan Muruganandam, Hillsborough, NJ (US); Jeevan Abichandani, Houston, TX (US); Kersten A. Terry, Midland, MI (US); Hemant G. Patel, Edison, NJ (US); George Rodriguez, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/514,547

(22) PCT Filed: Nov. 13, 2007

(86) PCT No.: PCT/US2007/023749
§ 371 (c)(1),
(2), (4) Date: Nov. 16, 2009

(87) PCT Pub. No.: WO2008/060512
PCT Pub. Date: May 22, 2008

(65) Prior Publication Data
US 2010/0063227 A1    Mar. 11, 2010

Related U.S. Application Data

(60) Provisional application No. 60/858,824, filed on Nov. 14, 2006.

(51) Int. Cl.
*C08F 4/646* (2006.01)
*C08F 4/6592* (2006.01)
*C08L 23/00* (2006.01)
*C08L 23/04* (2006.01)

(52) U.S. Cl. ........ 526/113; 526/114; 526/160; 526/161; 526/943; 525/191; 525/240

(58) Field of Classification Search .................. 526/113, 526/114, 160, 161, 943; 525/191, 240
See application file for complete search history.

(56) References Cited

U.S. PATENT DOCUMENTS

| 4,959,020 | A | 9/1990 | Di Rosa | |
|---|---|---|---|---|
| 6,271,323 | B1 * | 8/2001 | Loveday et al. | 526/161 |
| 6,274,684 | B1 | 8/2001 | Loveday et al. | 526/114 |
| 6,440,745 | B1 | 8/2002 | Weinberg et al. | 436/37 |
| 6,534,604 | B2 | 3/2003 | Loveday et al. | 526/113 |
| 6,605,675 | B2 | 8/2003 | Mawson et al. | 526/115 |
| 6,689,847 | B2 | 2/2004 | Mawson et al. | 526/116 |
| 6,841,631 | B2 | 1/2005 | Loveday et al. | 526/114 |
| 6,846,886 | B2 | 1/2005 | Mawson et al. | 526/115 |
| 6,894,128 | B2 | 5/2005 | Loveday et al. | 526/113 |
| 6,956,089 | B2 | 10/2005 | Mawson et al. | 526/116 |
| 7,005,398 | B2 | 2/2006 | Ishigaki | |
| 2003/0161763 | A1 | 8/2003 | Erden et al. | 422/99 |
| 2004/0162402 | A1 | 8/2004 | Mawson et al. | 526/129 |
| 2005/0182210 | A1 * | 8/2005 | Muruganandam et al. | 526/160 |
| 2005/0256280 | A1 | 11/2005 | Wenzel et al. | 526/62 |

FOREIGN PATENT DOCUMENTS

| RU | 2048660 | 11/1995 |
|---|---|---|
| RU | 41300 | 6/2004 |
| SU | 250596 | 1/1970 |
| WO | WO 99/64160 | 12/1999 |
| WO | WO 00/09255 | 2/2000 |
| WO | WO 01/30861 | 5/2001 |
| WO | WO 01/98371 | 12/2001 |
| WO | WO 02/46243 | 6/2002 |
| WO | WO 2005/068076 | 7/2005 |
| WO | WO 2006/022918 | 3/2006 |
| WO | WO 2006/086104 | 8/2006 |

OTHER PUBLICATIONS

Boussie T. R. et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society (2003), 125(14), pp. 4306-4317.
Brummer, Oliver et al., "High-Throughput Screening Applied to Process Development," Handbook of Combinatorial Chemistry, vol. 2, 2002, pp. 864-884.
Murphy, Vince et al., "High-Throughput Approaches for the Discovery and Optimization of New Olefin Polymerization Catalysts," Chemical Record (2002), 2(4), pp. 278-289.

* cited by examiner

*Primary Examiner* — Caixia Lu

(57) ABSTRACT

A method of polymerizing olefins with catalyst systems, such as, for example, a multimodal catalyst system, wherein the catalyst system is stored at a controlled temperature to minimize loss of catalyst system productivity.

26 Claims, 4 Drawing Sheets

CATALYST SYSTEMS AND POLYMERIZATION PROCESSES

CROSS-REFERENCE TO RELATED APPLICATIONS

This application is a National Stage application under 36 U.S.C. §371 of International Application No. PCT/US2007/023749, filed Nov. 13, 2007, that claims the benefit of Ser. No. 60/858,824, filed Nov. 14, 2006, the disclosures of which are incorporated by reference in their entireties.

FIELD OF THE INVENTION

Generally, the invention relates to methods of polymerizing olefins using catalyst systems.

BACKGROUND OF THE INVENTION

Polymers produced with a multimodal molecular weight distribution offer unique product properties. Multimodal products, particularly bimodal products, can be produced by various methods, such as mixing different polymers, producing multimodal polymers under a series of reaction conditions, and reacting different catalysts under a single reactor condition. One method that has proven to be commercially viable, is the production of multimodal catalyst systems wherein a catalyst system comprises more than one catalyst or catalyst component, thus, in effect, providing more than one active site to polymerize monomers during the polymerization process. When fed to a reaction system, each catalyst component concurrently produces a polymer component with distinct product properties. The net result is a polymer composition with distinct product advantages.

U.S. Pat. Nos. 6,605,675, 6,846,886, 6,956,089, 6,689,847, 6,274,684, 6,841,631, 6,894,128, 6,534,604, and PCT publications WO 2002/046243 and WO 2001/030861, generally, describe processes and techniques for making multimodal catalyst systems, and polymerizing with these multimodal catalyst systems. For example, these references discuss bimodal catalyst compositions comprising a combination of a Group 15 containing metal compound (a bisamide compound) and a metallocene compound. One of the advantages of these multimodal catalyst systems lies in the molecular weight split (ratio of high to low molecular weight polymer produced). However, the catalyst system productivity and molecular weight split of polymer produced with these multimodal catalysts can be significantly affected by degradation due to aging of the multimodal catalyst.

"Aging" is typically described as catalyst deactivation or loss of catalyst system productivity, over time. This problem is exacerbated when the catalyst systems includes two or more catalyst components that age at different rates. The degree of aging is typically ascertained by measuring the activity or productivity of a given catalyst batch over an extended period. Because the catalyst system can change over a period of time such as days or months, either in whole or in part by its respective catalyst components, exploring this phenomenon usually requires time and significant resources. Furthermore, multiple samples and polymerization tests are required to assure meaningful results.

Various methods and systems for testing catalyst systems have been developed. For instance, Brummer, Oliver et al., "High-Throughput Screening Applied To Process Development," Handbook of Combinatorial Chemistry, Vol. 2, 2002, pages 864-884, Boussie, T. R. et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society (2003), 125(14), pages 4306-4317, Murphy, Vince et al., "High-Throughput Approaches For The Discovery And Optimization Of New Olefin Polymerization Catalysts," Chemical Record (2002), 2(4), pages 278-289, and Boussie T. R. et al., "A Fully Integrated High-Throughput Screening Methodology For The Discovery Of New Polyolefin Catalysts: Discovery Of A New Class Of High Temperature Single-Site Group (IV) Copolymerization Catalysts," Journal of the American Chemical Society (2003), 125(14), pages 4306-17, generally, discuss methods of using high-throughput screening methods and devices in the development and evaluation of catalyst systems. Various test methods are also discussed in U.S. Pat. No. 6,440,745, U.S. Patent Application Publication No. 2003/161763, and PCT publications WO 1999/064160, WO 2001/098371, and WO 2000/009255.

Other background references include WO 2005/068076, WO 2006/022918, and WO 2006/086104.

Accordingly, there exists a need to understand the effects of aging and catalyst systems such as multimodal catalyst systems, and in turn, to control their aging. There is a further need to polymerize olefins with these catalyst systems to produce, for example, multimodal polymer compositions while being able to predict and control certain process and product properties, such as, for example, catalyst system productivity and polymer properties such as, for example, molecular weight distribution.

SUMMARY OF THE INVENTION

The current invention provides a method of polymerizing olefins by: providing a multimodal catalyst system; storing the multimodal catalyst system at a controlled temperature; contacting the multimodal catalyst system with a monomer selected from the group consisting of $C_2$ to $C_4$ alpha olefins in a polymerization process; and producing a multimodal polymer.

In one embodiment, the multimodal catalyst system comprises a bisamide catalyst system and a non-bisamide catalyst system. In another embodiment, the bisamide catalyst system comprises a Group 15 containing metal catalyst compound. In other embodiments the non-bisamide catalyst system comprises a metallocene catalyst system or a conventional transition metal catalyst system. The controlled temperature is preferably less than about 21° C., more preferably less than about 1° C., and even more preferably of less than about −9° C.

In other embodiments, the bisamide catalyst system comprises a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

The multimodal catalyst system in some embodiments comprises a spray dried catalyst mixture, wherein the spray dried catalyst mixture comprises a bisamide catalyst compound, a metallocene catalyst compound, an activator, and a residual solvent. The spray dried catalyst mixture in some of these embodiments comprises about 1 to about 3 wt % (weight percent) of the bisamide catalyst compound and the metallocene compound combined. The spray dried catalyst mixture in other embodiments comprises about 30 to about 50 wt % of the activator. In another embodiment, the spray dried catalyst mixture comprises about 50 to about 70 wt % of a silica filler and about 2 to about 4 wt % of the residual solvent.

In one embodiment of the invention, the spray dried catalyst mixture is dispersed in a liquid to form a slurried catalyst mixture. The liquid in one embodiment comprises an oil and a hydrocarbon, wherein the hydrocarbon is a $C_6$ or higher alkane. In one embodiment, the $C_6$ or higher alkane is hexane. In another embodiment, the C6 or higher alkane is high-purity isoparaffinic solvent having an ASTM D 86 boiling point above about 97° C. In one embodiment, the slurried catalyst mixture comprises about 15 to about 30 wt % of the spray dried catalyst mixture. In another embodiment, the slurried catalyst mixture comprises about 60 to about 70 wt % of the oil and less than about 20 wt % of the $C_6$ or higher alkane.

In yet another embodiment, the bisamide catalyst system comprises a support, an activator and a Group 15 containing metal catalyst compound, the non-bisamide catalyst system comprises a metallocene catalyst compound, the contacting step is conducted at a temperature of greater than about 60° C. and a pressure of from about 200 psig to about 400 psig, the multimodal catalyst system is stored for at least 30 days, the controlled temperature is less than about 1° C.; and an aged catalyst productivity is at least about 75% of a fresh catalyst productivity. In an alternate to this embodiment, the aged catalyst productivity is at least about 85% of the fresh catalyst productivity, whereas in another embodiment, the aged catalyst productivity is at least about 90% of the fresh catalyst productivity. In other alternate embodiments, the multimodal catalyst is stored for at least 60 days, and in still other alternate embodiments, the multimodal catalyst is stored for at least 100 days.

In one embodiment of the method: the bisamide catalyst system comprises a support, an activator, and a Group 15 containing metal catalyst compound; the non-bisamide catalyst system comprises a metallocene catalyst compound; the contacting step is conducted at a temperature of greater than about 60° C. and a pressure of from about 200 psig to about 400 psig; the multimodal catalyst system is stored for at least 30 days; the controlled temperature is less than about 1° C.; and a high molecular weight fraction of an aged catalyst polymer produced in the contacting step is at least about 85% of the high molecular weight fraction of a fresh catalyst polymer. In an alternative to this embodiment, the high molecular weight fraction of the aged catalyst polymer is at least about 90% of the high molecular weight fraction of a fresh catalyst polymer. In other alternate embodiments, the multimodal catalyst is stored for at least 60 days, and in still other alternate embodiments, the multimodal catalyst is stored for at least 100 days. In still other alternate embodiments, the controlled temperature is less that about −9° C.

The current invention also provides a method of polymerizing olefins to produce a multimodal polymer comprising the steps of: providing a multimodal catalyst system comprising a bisamide catalyst system and a non-bisamide catalyst system; and contacting the multimodal catalyst system with an alpha olefin composition in a polymerization process to produce a multimodal polymer, wherein a product property of the multimodal polymer is predicted using a predicted aging characteristic response of the multimodal catalyst system. In one embodiment, the predicted aging characteristic response is determined using an accelerated aging method. In a further embodiment, the accelerated aging method uses a high throughput polymerization unit.

In another embodiment wherein a product property of the multimodal polymer is predicted using a predicted aging characteristic, the method may further comprise the steps of: determining a first aging characteristic response of the bisamide catalyst system; determining a second aging characteristic response of the non-bisamide catalyst system; and combining the first aging characteristic response and the second aging characteristic response to produce the predicted aging characteristic response of the multimodal catalyst system.

In another embodiment wherein a product property of the multimodal polymer is predicted using a predicted aging characteristic, the non-bisamide catalyst system comprises a metallocene catalyst compound, and the bisamide catalyst system comprises a support, an activator and a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

In yet another embodiment wherein a product property of the multimodal polymer is predicted using a predicted aging characteristic, the alpha olefin composition comprises a monomer selected from the group consisting of $C_2$ to $C_4$ alpha olefins and a comonomer selected from the group consisting of $C_4$ to $C_8$ alpha olefins, and wherein the contacting occurs at a temperature of greater than about 60° C. and a pressure of about 200 psig to about 400 psig.

In another embodiment, the first aging characteristic response is a first catalyst productivity response of the bisamide catalyst system as a function of time, the second aging characteristic response is a second catalyst productivity response of the non-bisamide catalyst system as a function of time, and the predicted aging characteristic response is an aged catalyst productivity response of the multimodal catalyst system as a function of time.

In yet another embodiment, the first aging characteristic response is a first molecular weight distribution response of the bisamide catalyst system after a storage time, the second aging characteristic response is a second molecular weight distribution response of the non-bisamide catalyst system as a function of time, and the predicted aging characteristic response is a predicted molecular weight distribution response using the multimodal catalyst as a function of time.

In various embodiments wherein a product property of the multimodal polymer is predicted using a predicted aging characteristic, the storage time is at least 30, 60, or 100 days.

In another embodiment of the method, the first aging characteristic response is a first melt index response of the bisamide catalyst system as a function of time, the second aging characteristic response is a second melt index response of the non-bisamide catalyst system as a function of time, and the predicted aging characteristic response is a predicted melt index response of the multimodal catalyst system as a function of time.

In still another embodiment, the product property predicted is a multimodal polymer melt index, a catalyst residual content, a molecular weight distribution, a percentage of high molecular weight component, or a percentage of low molecular weight component.

In other embodiments, the predicted aging characteristic response is the productivity response, hydrogen response, comonomer response, or comonomer response of the multimodal catalyst system.

In other embodiments, the predicted aging response is the productivity response, hydrogen response, comonomer response, or comonomer response of the multimodal catalyst system determined in a batch, gas phase reactor.

In still other embodiments, the first aging characteristic response and the second aging characteristic response are determined using an accelerated aging method. In further embodiments, the accelerated aging method uses a high throughput polymerization testing unit.

In still another embodiment, a model of the aging characteristic response of the multimodal catalyst system is developed based on assumptions of a first order decay or a second order decay.

The current invention also provides a method of controlling the aging of a multimodal catalyst comprising: providing a multimodal catalyst system comprising a bisamide catalyst system and a non-bisamide catalyst system; and transporting the multimodal catalyst system in a portable vessel, wherein the portable vessel is kept at a controlled temperature of less than about 21° C. In another embodiment, the portable vessel is kept at a controlled temperature of less than about 1° C., and more preferably less than about −9° C.

In another embodiment wherein the multimodal catalyst is transported, the bisamide catalyst system comprises a Group 15 containing metal catalyst compound. In still another embodiment wherein the multimodal catalyst is transported, the non-bisamide catalyst system comprises a metallocene catalyst system.

In still another embodiment wherein the multimodal catalyst is transported, the non-bisamide catalyst system comprises a metallocene catalyst system, and the bisamide catalyst system comprises a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group. In a further embodiment of the embodiment immediately preceding, the controlled temperature is less than about 1° C., and in yet another the controlled temperature is less than about −9° C.

Another class of embodiments provides a container or vessel comprising the multimodal catalyst system wherein the multimodal catalyst system or the catalyst system is maintained at a controlled temperature. In at least one embodiment, the container or vessel the multimodal catalyst system may be agitated while in the container or vessel.

Another embodiment of the invention provides a method of polymerizing olefins, further comprising the steps of: a) warming the multimodal catalyst system after storing the multimodal catalyst system at the controlled temperature; and b) agitating the multimodal catalyst system before contacting the multimodal catalyst system with the monomer.

In another embodiment, the multimodal catalyst system is agitated after warming the multimodal catalyst system.

In at least one embodiment, the multimodal catalyst system is agitated for at least about 24 hours.

In at least one embodiment, the multimodal catalyst system is warmed to at least about 10° C. before contacting the multimodal catalyst system with the monomer.

In at least one other embodiment, the multimodal catalyst system is warmed to at least about 10° C. before agitating the multimodal catalyst system.

Other features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF SUMMARY OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
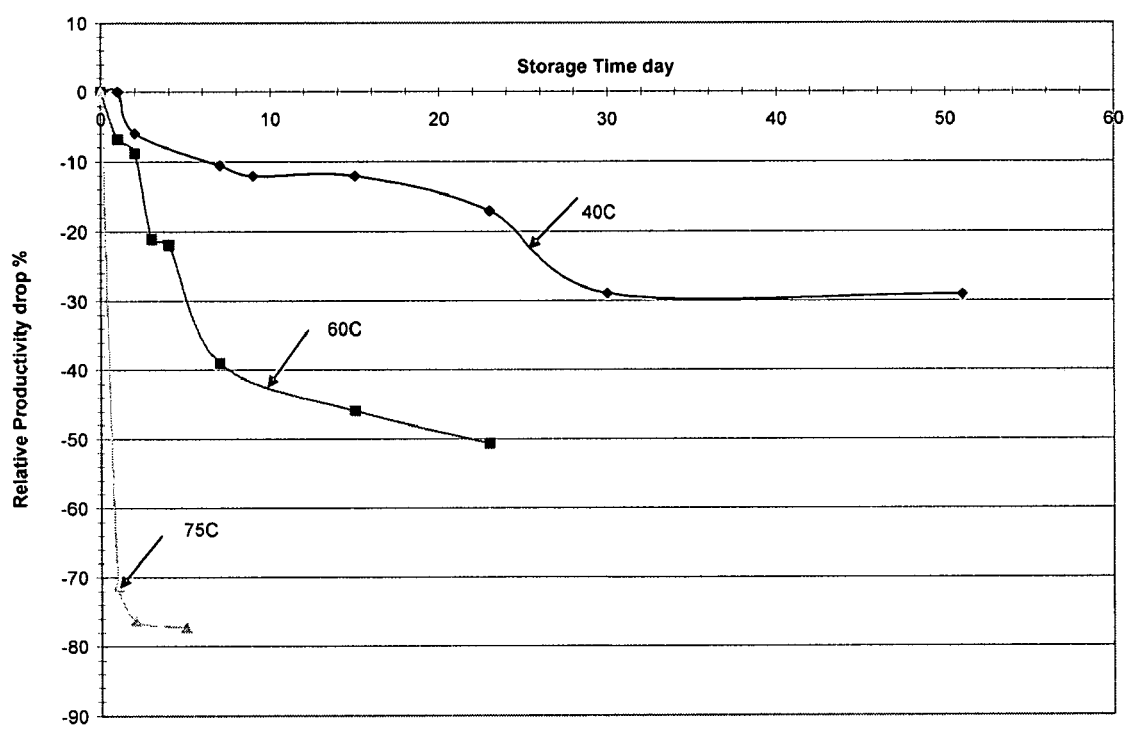
FIG. 1 is a graph showing the change in the productivity over time of a multimodal catalyst powder stored at multiple temperatures.

The invention provides a method of polymerizing olefins comprising steps of: providing a multimodal catalyst system; storing the multimodal catalyst system at a controlled temperature; contacting the multimodal catalyst system with a monomer selected from the group consisting of $C_2$ to $C_4$ alpha olefins in a polymerization process; and producing a multimodal polymer. In one embodiment, the multimodal catalyst system comprises a bisamide catalyst system and a non-bisamide catalyst system. In another embodiment, the catalyst system is contacted with a monomer selected from the group consisting of $C_2$ to $C_4$ alpha olefins and a comonomer selected from the group consisting of $C_4$ to $C_8$ alpha olefins in the polymerization process.

As used herein, "catalyst aging" refers to the phenomenon wherein the responses of the catalyst system change over a period of time during which the catalyst mixture is stored after manufacture. These changes in catalyst system responses are reflected in the fact that the catalyst system will have different responses when compared to producing a polymer at the same conditions after the catalyst mixture is stored for a period of time after the catalyst is manufactured. For example, the catalyst productivity of a catalyst mixture may drop, or the molecular weight distribution of the polymer produced may change after the catalyst mixture is stored for a period of time. This is particularly troublesome for multimodal catalyst systems. For example, in a bimodal catalyst system, a high molecular weight (HMW) polymer component is produced from a first catalyst component and a low molecular weight (LMW) polymer component is produced from a second catalyst component under the same reaction conditions. Overall productivity is driven by these component activities. Furthermore, the molecular weight distribution is determined by the relative productivities of these two components. Thus, when aging affects the productivity, it also affects the molecular weight distribution. Specifically, the HMW or flow index and the split (percentage of HMW and LMW) are affected by aging. This has a direct effect on product properties. The term "multimodal polymer" as used herein, means a polymer comprising at least a "bimodal molecular weight distribution," which term is understood as having the broadest definition persons in the pertinent art have given that term as reflected in printed publications and issued patents. Thus in a preferred embodiment, a multimodal polymer may have at least two molecular weight peaks. For example, a single composition that includes polyolefins with at least two identifiable molecular weight distributions is considered to be a "multimodal" polymer, as that term is used herein. Preferably, other than having different molecular weights, the polymer components may have different levels of comonomer distribution.

The term "unimodal," as used herein to describe a polymer or polymer composition, means any polymer, e.g., polyethylene, that is not multimodal as defined above, e.g., one having a single molecular weight distribution.

The terms "multi modal catalyst system" or "multimodal catalyst" as used herein refers to a catalyst system comprising at least two catalyst components or systems, each catalyst component or system capable of producing a polymer with different product properties, such as, for example, molecular weight distribution, comonomer distribution, or other product property. The term "multimodal catalyst system" is intended to include a bimetallic catalyst as well as a multiple-catalyst system, and includes any composition, mixture or system that includes at least two different catalyst compounds, each having a different metal group. Preferably, each different catalyst compound resides on a single support particle, so that the dual or bimetallic catalyst is a supported dual or bimetallic catalyst. However, as used herein, the term multimodal catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the dual or bimetallic catalyst system, i.e., the two collections of supported catalysts. The catalysts systems as described above may optionally contain other components such as activators, continuity additives, etc. The catalyst systems as described above may have the same or different metals, the same or different ligands, and the same or different leaving groups.

Without being bound to one particular theory, it is believed that the response of the catalyst is variable over time because the polymerization response of various components of the catalyst system may be change over time at varying rates. It has been discovered that the rate of this change over time was dependent on the temperature at which the catalyst was stored. This change in catalyst response is particularly troublesome for multimodal catalyst systems, especially when the multimodal catalyst system comprises a bisamide and a non-bisamide catalyst component. If the polymerization response of the two catalyst components change at a different rate, then the properties of the polymer produced at the same reactor conditions will change with the age of the catalyst.

Without being bound to one particular theory, it is also believed that a bisamide catalyst component is more thermally unstable than a non-bisamide catalyst component. This can be seen by the dramatic change over time in catalyst productivity and polymerization response (see Examples below) of a catalyst containing only a bisamide catalyst component, particularly when stored at elevated temperatures. Conversely, a catalyst containing a non-bisamide component exhibited much less change over time in catalyst polymerization response. Thus, when a multimodal catalyst system comprises a bisamide and a non-bisamide component, the polymerization response of the two components change at a different rate. This difference is greater at higher storage temperatures. Because the molecular weight response and productivity of the two components are different over time, a different multimodal polymer is produced at the same conditions. The change in response depends on how long the catalyst system is stored and the temperature at which it is stored.

If the polymerization response of a catalyst system is unpredictable, significant quantities of off-grade material are produced at the beginning of a catalyst run (as used herein, a "catalyst run" is the period of time a particular container of catalyst is fed to the reaction system) while the polymerization responses are evaluated and the reaction conditions modified to compensate. This process is repeated if a catalyst batch that is newer or older is fed to the reaction system. Furthermore, poor catalyst productivity leads some of the older catalyst batches to be unusable. By storing the catalyst at a controlled temperature, the catalyst response is more predictable, and in some cases, stable over long periods of storage time. Because the catalyst is more predictable, less off-grade is produced at the beginning of a catalyst run.

As used herein, "aged catalyst" refers to a catalyst, in a particular embodiment, a multimodal catalyst system, that has been stored a period of time, typically for more than 5 days, preferably for more than about 30 days, more preferably for more than about 60 days, and even more preferably for more than about 100 days.

As used herein, "fresh catalyst productivity" refers to the catalyst productivity of the multimodal catalyst system when it is fed to the polymerization system soon (before the catalyst substantially changes) after the catalyst is manufactured. An "aged catalyst productivity" refers to the catalyst productivity of the multimodal catalyst system when it is fed to the polymerization system after the catalyst has been stored for a period of time, typically for more than 5 days, preferably for more than about 30 days, more preferably for more than about 60 days, and even more preferably for more than about 100 days. In one embodiment of the invention, aged catalyst productivity is at least about 75% of the fresh catalyst productivity, and preferably greater than about 85% of the fresh catalyst productivity, and even more preferably greater than about 90% of the fresh catalyst productivity.

As used herein, "at a controlled temperature" refers to maintaining the temperature within given range taking into account the temperature at times may exceed either end of the range so long as the nature of the chemical or composition that is being controlled at a given temperature or temperature range is not materially altered or effected. In a class of embodiments, the temperature is maintained within 30° C. (+/− of a given temperature); alternatively, within 20° C. (+/− of a given temperature); alternatively, within 10° C. (+/− of a given temperature); alternatively, within 5° C. (+/− of a given temperature); and alternatively, within 2° C. (+/− of a given temperature).

A change in the molecular weight distribution of the polymer can be characterized by measuring the high molecular weight and low molecular weight fractions of a "fresh catalyst polymer" (polymer produced using a multimodal catalyst system before the catalyst substantially changes) and comparing that to the high molecular weight and low molecular weight fractions of an "aged catalyst polymer" (polymer produced using a multimodal catalyst that has been stored for a period of time). In one embodiment of the invention, a high molecular weight fraction of an aged catalyst polymer produced in the contacting step is at least about 85% of the high molecular weight fraction of a fresh catalyst polymer. In another embodiment, the high molecular weight fraction of the aged catalyst polymer is at least about 90% of the high molecular weight fraction of a fresh catalyst polymer.

In accordance with the current invention, the multimodal catalyst system is stored at a controlled temperature to prevent the catalyst from "aging." In one embodiment, the catalyst system is stored as a controlled temperature of less than about 21° C., preferably less than about 1° C., and even more preferably less than about −9° C.

The length of time a multimodal catalyst system is typically stored can vary depending on production schedules, manufacturing locations, shipping times, and other factors. The storage time can be a matter of a few days, or several months. For the purposes of this specification, the catalyst is considered to be in storage from the time it is manufactured to the time it is injected into the polymerization system, including the time it is being transported, or held in a vessel of any kind. Thus, the period of time during which the catalyst mixture is stored is that time from the date of manufacture to the date the catalyst is injected into the polymerization system. In one embodiment, the multimodal catalyst system is stored for at least 30 days, preferably for at least 60 days, and even more preferably at least 100 days.

The controlled temperature storage of the catalyst system may be by any means known to one of skill in the art. For example, the catalyst system may be stored in a jacketed storage vessel, wherein the temperature of catalyst system is monitored and controlled. In another example, the catalyst system is placed in a storage vessel or cylinder and the storage vessel or cylinder is placed in a temperature controlled environment, such as a refrigerated locker, refrigerated truck, or refrigerated transportation compartment.

Polymerization Processes

Embodiments of the invention described herein are suitable for use in any polymerization process that facilitates the contacting of the catalyst with the monomer or monomer/comonomer. Polymerization processes include solution, gas phase fluid bed, slurry phase, and a high pressure process or a combination thereof. Preferred processes include gas phase fluid bed or slurry phase polymerization of one or more olefins at least one of which is ethylene or propylene. A gas phase process is particularly preferred (see for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference). Also preferred are polymerization processes, particularly a gas phase fluid bed process, comprising a cycle fluid that comprises a gas phase and a liquid phase.

In one embodiment, the method of this invention is directed toward a solution, high pressure, slurry, or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene 1, hexene-1, octene-1 and decene-1.

Other monomers useful in the method of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In one preferred embodiment of the method of the invention, a copolymer of ethylene is produced, where with ethylene, a comonomer having at least one alpha-olefin having from 3 to 15 carbon atoms, preferably from 4 to 12 carbon atoms, and most preferably from 4 to 8 carbon atoms, is polymerized in a gas phase process.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process during the contacting step may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the method of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264, both of which are herein incorporated by reference. Propylene based polymers that are produced in the method of the invention include atactic polypropylene, isotactic polypropylene, and syndiotactic polypropylene. Other propylene polymers include propylene random, block or impact copolymers.

One preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 5,986,021, which are herein fully incorporated by reference.

Examples of solution processes are described in U.S. Pat. Nos. 4,271,060, 5,001,205, 5,236,998, 5,589,555 and 5,977,251 and PCT WO 99/32525 and PCT WO 99/40130, which are fully incorporated herein by reference Catalyst Systems The multimodal catalyst system utilized by the invention may be any suitable multimodal catalyst system for polymerizing alpha olefins. The catalyst compounds which may be utilized in the catalyst system of the invention include invention include: Group 15 containing metal compounds; metallocene compounds; phenoxide catalyst compounds; additionally discovered catalyst compounds; and conventional-type transition metal catalysts. All references to chemical compounds used herein refer to the new IUPAC system of describing the science of chemistry in general as defined in *Nomenclature of Organic Chemistry*, Oxford:Pergamon Press, 1979; *A Guide to IUPAC Nomenclature of Organic Compounds, Recommendations* 1993, Oxford:Blackwell Scientific Publications, 1993 and *Nomenclature of Inorganic Chemistry, Recommendations* 1990, Oxford:Blackwell Scientific Publications. (1990). Under the new IUPAC system, a Group 15 element is an element from the Nitrogen group elements (a.k.a. group VA, formerly Group V of the old periodic table). The multimodal catalyst system of the invention may comprise the catalyst compositions described in U.S. Pat. Nos. 6,605,675, 6,846,886, 6,956,089, 6,274,684, 6,841,631, 6,894,128, 6,534,604, and 6,689,847 and PCT publications WO01/30861 and WO02/46243, all of which are incorporated herein by reference. Preferred catalyst systems further include a catalyst system comprising a supported bisamide catalyst as described in U.S. Pat. No. 6,271,325, which is also incorporated herein by reference.

In one embodiment, the bisamide catalyst system of the invention may comprise one or more Group 15 containing metal catalyst compounds. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one embodiment, at least one of the Group 15 atoms are also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

Other bisamide catalyst compounds are those Group 5 and 6 metal imido complexes described in EP-A2-0 816 384 and U.S. Pat. No. 5,851,945, which is incorporated herein by reference. In addition, bisamide catalyst compounds include bridged bis(arylamido) Group 4 compounds described by D. H. McConville, et al., in Organometallics 1195, 14, 5478-5480, which is herein incorporated by reference. In addition, bridged bis(amido) catalyst compounds are described in WO 96/27439, which is herein incorporated by reference. In one embodiment, the multimodal catalyst system comprises a "bisamide" catalyst compound combined with an activator, spray dried to a powder state, then combined with mineral oil to form a slurry as described in U.S. Pat. No. 6,605,675, which is incorporated herein by reference.

In one embodiment of the invention, the multimodal catalyst system comprises a bisamide catalyst system and a non-bisamide catalyst system. A non-bisamide catalyst system may be any catalyst system compatible with the bisamide catalyst system. In one embodiment, the non-bisamide catalyst system comprises a metallocene system or a conventional transition metal catalyst system.

As used herein, the term "metallocene" is to be construed broadly, to include any compound that is described as a "metallocene" in a publication or patent, as well as any chemical compound or structure that is described herein as a metallocene. Metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, metallocene catalysts compounds useful in the invention include metallocene compounds described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In at least one broad embodiment, the metallocene catalyst is a compound represented by the formula CPm MRn Xq, wherein "Cp" refers to either a cyclopentadienyl ring, which may be substituted or unsubstituted, or a cyclopentadienyl ring derivative, such as an indenyl ring, which also may be substituted or unsubstituted. In a specific embodiment the metallocene used to make the unimodal polyethylene includes two cyclopentadienyl rings, and such a metallocene is referred to herein as a "biscyclopentadienyl metallocene" or a "bis-Cp metallocene." Preferably, the metallocene used to form one of the polyethylenes, and preferably the metallocene used to form (e.g., prepare or make) the "second polyethylene" described herein (e.g., one of the two polyethylenes in a 2-polyethylene blend composition) has two or more Cp ligands, most preferably two Cp ligands; and is thus to be considered a "bis-Cp metallocene." In a more specific embodiment, the metallocene is a substituted biscyclopatendienyl, preferably one that is substituted with a methyl group and a butyl group, such as bis(1,3-methylbutyldcyclopentadienyl) zirconium dichloride or difluoride.

Other examples of metallocenes are identified in 1 & 2 Metallocene-Based Polyolefins (John Scheirs & W. Kaminsky eds., John Wiley & Sons, Ltd. 2000); G. G. Hlatky in 181 Coordination Chem. Rev. 243-296 (1999) and in particular, those metallocenes for use in the synthesis of polyethylene in 1 Metallocene-Based Polyolefins 261-377 (2000). The metallocene catalyst compounds described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components." Each metallocene described herein is preferably supported on a support material in a particular embodiment as described further below, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are preferably selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are preferably selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno [1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

It is within the scope of this invention, in one embodiment, that the metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes may be either dialkyl ether adducts, or alkylated reaction products of the described dihalide complexes that can be activated to a cationic state by the activators of this invention described below.

Also, one or more specific embodiments of the compositions described herein include a multimodal catalyst system, comprising HN3, bis(2-(trimethylphenylamido)ethyl)amine zirconium dibenzyl (for a high molecular weight component) and P-metallocene catalyst bis(n-propyl Cp) zirconium dichloride (for a low molecular weight component).

Also included as metallocene catalyst are those diimine based ligands of Group 8 to 10 metal compounds disclosed in PCT publications WO 96/23010 and WO 97/48735 and Gibson, et. al., Chem. Comm., pp. 849-850 (1998), all of which are herein incorporated by reference.

It is also contemplated that in one embodiment, the metallocene catalysts of the invention described above include their structural or optical or enantiomeric isomers (meso and racemic isomers, for example see U.S. Pat. No. 5,852,143, incorporated herein by reference) and mixtures thereof.

Conventional transition metal catalysts are those traditional Ziegler-Nata catalysts and Phillips-type chromium catalyst well known in the art. Examples of conventional transition metal catalysts are discussed in U.S. Pat. Nos. 4,115,639, 4,077,904 4,482,687, 4,564,605, 4,721,763, 4,879,359 and 4,960,741 all of which are herein fully incorporated by reference. The conventional transition metal catalyst compounds that may be used in the present invention include transition metal compounds from Groups III to VIII, preferably IVB to VIB of the Periodic Table of Elements.

Still other conventional transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

Other catalysts may include cationic catalysts such as $AlCl_3$, vanadium, constrained-geometry catalysts, cobalt, and iron catalysts, all being well known in the art.

In one embodiment of the invention, the multimodal catalyst system comprises a spray dried catalyst mixture, wherein the spray dried catalyst compound comprises a bisamide catalyst compound, a metallocene catalyst compound, an activator, and a residual solvent. In a preferred embodiment, fumed silica is combined with methyl alumoxane and then spray dried to from supported methyl alumoxane.

In another embodiment, the catalyst compounds and/or the activators are preferably combined with a support material such as a particulate filler material and then spray dried, preferably to form a free flowing powder. Spray drying may be by any means known in the art. See EP A 0 668 295 B1, U.S. Pat. No. 5,674,795 and U.S. Pat. No. 5,672,669 and U.S. patent application Ser. No. 09/464,114 filed Dec. 16, 1999, which particularly describe spray drying of supported catalysts.

Spray drying methods and compositions particularly useful to the current invention are also described in U.S. Pat. No. 6,605,675, which is incorporated herein by reference. In general one may spray dry the catalysts by placing the catalyst compound and the optional activator in solution (allowing the catalyst compound and activator to react, if desired), adding a filler material such as silica or fumed silica, such as Gasil™ or Cabosil™, then forcing the solution at high pressures through a nozzle.

In some spray dried catalyst mixtures, two or more catalyst compounds can be added together and cosprayed. Furthermore, additional additives or solvents, such as 1-hexene can be present in the activator/filler mixture.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

In one embodiment of the invention, the spray dried catalyst mixture comprises less than about 5 wt % of the bisamide catalyst compound and a metallocene compound combined, and preferably, about 1 to about 3 wt % of the bisamide catalyst compound and the metallocene compound combined.

In another embodiment the spray dried catalyst mixture comprises about 30 to about 50 wt % of the activator, preferably about 35 to about 40 wt % of the activator.

In yet another embodiment, the spray dried catalyst mixture comprises about 50 to about 70 wt % of the silica filler, and preferably about 50 to about 60 wt % of the silica filler.

In other embodiments, the spray dried catalyst mixture comprises about 1 to about 6 wt % of the residual solvent, and preferably about 2 to about 4 wt % of the residual solvent.

In one preferred embodiment, the spray dried catalyst mixture comprises: about 1 to about 3 wt % of the bisamide catalyst compound and the metallocene compound combined; about 30 to about 50 wt % of the activator; about 50 to about 70 wt % of the silica filler; and about 2 to about 4 wt % of the residual solvent.

In one embodiment, the multimodal catalyst system comprises the spray dried mixture disclosed above dispersed in a liquid to form a slurried catalyst mixture. This slurried catalyst mixture is then fed into the polymerization reactor. In one embodiment, the liquid comprises an oil and a hydrocarbon, wherein the hydrocarbon is a $C_6$ or higher alkane. The slurried catalyst mixture preferably has about 10 to 40 weight % spray dried mixture in the slurried catalyst mixture, and preferably 15 to 30 weight % spray dried mixture in the slurried catalyst mixture.

In yet another embodiment, the slurried catalyst mixture comprises about 60 to about 70 wt % of the oil and less than about 20 wt % of the $C_6$ or higher alkane. In still further embodiments, the $C_6$ or higher alkane is preferably hexane, and more preferably a high-purity isoparaffinic solvent, such those available from ExxonMobil Chemical as Isopar™ Fluids, having an ASTM D 86 boiling point above about 97° C. (Isopar™ is a trademark of ExxonMobil Corporation).

One embodiment of the invention provides a method of polymerizing olefins comprising steps of: providing a multimodal catalyst system comprising a bisamide catalyst system and a non-bisamide catalyst system; storing the multimodal catalyst system at a controlled temperature; contacting the multimodal catalyst system with a monomer selected from the group consisting of $C_2$ to $C_4$ alpha olefins in a polymerization process; and producing a multimodal polymer. In this embodiment: the bisamide catalyst system comprises a support, an activator and a Group 15 containing metal catalyst compound; the non-bisamide catalyst system comprises a metallocene catalyst compound; the contacting step is conducted at a temperature of greater than about 60° C. and a pressure of from about 200 psig to about 400 psig; the multimodal catalyst is stored for at least 30 days; the controlled temperature is less than about 1° C.; and an aged catalyst productivity is at least about 75% of a fresh catalyst productivity. In another embodiment, an aged catalyst productivity is at least about 85% of a fresh catalyst productivity, and preferably at least about 90% of a fresh catalyst productivity. In an alternate embodiment, the controlled temperature is less than about −9° C.

One embodiment of the invention provides a method of polymerizing olefins comprising steps of: providing a multimodal catalyst system comprising a bisamide catalyst system and a non-bisamide catalyst system; storing the multimodal catalyst system at a controlled temperature; contacting the multimodal catalyst system with a monomer selected from the group consisting of $C_2$ to $C_4$ alpha olefins in a polymerization process; and producing a multimodal polymer. In this embodiment: the bisamide catalyst system comprises a support, an activator and a Group 15 containing metal catalyst compound; the non-bisamide catalyst system comprises a metallocene catalyst compound; the contacting step is conducted at a temperature of greater than about 60° C. and a pressure of from about 200 psig to about 400 psig; the multimodal catalyst is stored for at least 30 days; the controlled temperature is less than about 1° C.; and a high molecular weight fraction of an aged catalyst polymer produced in the contacting step is at least about 85% of the high molecular weight fraction of a fresh catalyst polymer, preferably the high molecular weight fraction of the aged catalyst polymer is at least about 90% of the high molecular weight fraction of a fresh catalyst polymer. In an alternate embodiment, the controlled temperature is less than about −9° C.

In some embodiments of the invention, the multimodal catalyst system is warmed after being stored at the controlled temperature, and then agitated before contacting the multimodal catalyst system with the monomer. As used herein, "warmed" refers to raising the temperature of the multimodal catalyst system above the temperature at which it is stored. The multimodal catalyst system may be warmed by simply removing the multimodal catalyst system from the controlled temperature storage environment and allowing the ambient conditions to heat the catalyst. The catalyst may also be warmed by placing the multimodal catalyst system if a heated environment, or applying heat to the storage container holding the multimodal catalyst system.

The term "agitated," as used herein refers to giving motion to the multimodal catalyst system to allow the solids in the catalyst system to be suspended in a diluent of the slurry catalyst system. The agitation can be by any method suitable to cause the solids and the diluent to mix together and effect the suspension of the solids. In some embodiments, the agitation may be provided by shaking, rolling or otherwise moving the container or vessel holding the multimodal catalyst system.

In some embodiments herein, the multimodal catalyst system is agitated after warming the multimodal catalyst system. In this embodiment, the container or vessel holding the multimodal catalyst system may be removed from the controlled environment a period of time prior to when the catalyst is to be agitated. Then, after the catalyst warms, it is agitated by an agitating device, for example a catalyst vessel rolling device.

In some embodiments, the multimodal catalyst system may be agitated for a period of time sufficient to ensure that solid catalyst particles contained in the multimodal catalyst system are fully suspended in the slurry. In some embodiments, the multimodal catalyst system may be agitated at least about 12, 24, 36, or more hours to allow any catalyst particles that have settled out of suspension to be re-suspended.

In other embodiments, the multimodal catalyst system may be warmed to at least about 0, 10, or 20° C. before contacting the multimodal catalyst system with the monomer. In some embodiments, the multimodal catalyst system may warmed before agitating the multimodal catalyst system. In other embodiments, the multimodal catalyst system may warmed while agitating the multimodal catalyst system, or even after the multimodal catalyst system has been agitated.

Multimodal Polymers

One or more specific embodiments of the compositions described herein include a bimodal polyethylene. In certain embodiments, a bimodal polyethylene for the composition may be prepared as described in U.S. Pat. Nos. 6,605,675 or 6,608,149, both of which are incorporated by reference, particularly the aspects that disclose and teach the preparation of bimodal polyethylene. In at least one particular embodiment, a composition includes a bimodal polyethylene prepared using catalyst systems described herein. For example, a bimodal polyethylene can be prepared by a polymerization conducted in the presence of a catalyst system that includes a fumed particulate filler and a catalyst compound represented by the formula:

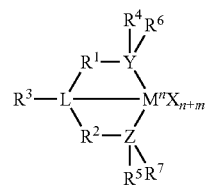

wherein M is a Group 4, 5 or 6 metal; each X is independently an anionic leaving group; n is the oxidation state of M; m is the formal charge of the ligand comprising Y, Z and L; Y is a Group 15 atom; Z is a Group 15 atom; L is a Group 15 atom; $R^1$ and $R^2$ are independently a $C_1$ to $C_{20}$ hydrocarbon group, or a heteroatom containing group wherein the heteroatom is silicon, germanium, tin, lead, or phosphorus; optionally, $R^1$ and $R^2$ are interconnected to each other; $R^3$ is absent, a hydrogen, a group 14 atom containing group, a halogen, or a heteroatom containing group; $R^4$ and $R^5$ are independently an alkyl group, an aryl group, a substituted aryl group, a cyclic alkyl group, a substituted cyclic alkyl group, or a multiple ring system; and $R^6$ and $R^7$ are independently absent, a hydrogen, an alkyl group, a halogen, a heteroatom, a hydrocarbyl group, or a heteroatom containing group.

Predicting Multimodal Catalyst Response:

One advantage of the current invention lies in the ability to minimize the change in polymerization response of the multimodal catalyst system, while another lies in the ability to predict properties of polymer produced with aged catalyst. Accordingly, the current invention also provides a method of polymerizing olefins to produce a multimodal polymer by providing a multimodal catalyst system comprising a bisamide catalyst system and a non-bisamide catalyst system, and contacting the multimodal catalyst system with an alpha olefin composition in a polymerization process to produce a multimodal polymer, wherein a product property of the multimodal polymer is predicted using a predicted aging characteristic response of the multimodal catalyst system.

The predicted aging characteristic response may be any characteristic response used to evaluate the polymerization performance of the multimodal catalyst system. Of particular interest is the response of the multimodal catalyst system in producing a polymer with a particular product property or the response of the multimodal catalyst system to a particular polymerization parameter. As used herein, "response" refers to the quantifiable performance of a catalyst system at a given set of polymerization conditions, or a performance prediction model as a function of a polymerization parameter or polymerization conditions.

The product property may be any polymer property, and is preferably a product property or polymerization property effected by the catalyst composition. The product property may be residual catalyst content, catalyst ash, a multimodal polymer melt index, density, melt flow ratio, molecular weight distribution, a percentage of high molecular weight component, or a percentage of low molecular weight component, or any other measurable polymer property. The polymerization parameter may be the catalyst productivity, hydrogen concentration, monomer concentration, comonomer concentration, activator concentration, polymerization temperature, or any other process parameter.

Thus, as used herein, the predicted aging characteristic response refers to the quantifiable performance the aged (post storage) multimodal catalyst system at a given set of polymerization conditions, or a performance prediction model as a function of a polymerization parameter or polymerization conditions. For example, the predicted aging characteristic response may be a catalyst response as a function of storage time, temperature, or combination thereof, or a change in a catalyst response as a function of storage time, temperature, or combination thereof. The catalyst response may be the catalyst productivity response, molecular weight distribution response of the catalyst, melt index response of the catalyst, density response of the catalyst, hydrogen response, comonomer response, or any other polymer property response of the catalyst.

In order to quantify the effect of catalyst aging on the multimodal catalyst system, tests may be conducted on each catalyst component to determine the polymerization response of that catalyst component over time. These tests can take a very long time due to slow changes over time of catalyst response. Thus, in one embodiment of the invention, the predicted aging characteristic response is determined using an accelerated aging method. As used herein, an "accelerated aging method" refers to a method wherein the tests to quantify the polymerization response are accelerated by storing the test catalyst at an elevated temperature before the test catalyst is evaluated. Thus, an accelerated aging method comprises the steps of producing a test catalyst, preferably comprising a single catalyst component system, storing the test catalyst at an elevated temperature, polymerizing the test catalyst, and evaluating the polymerization response of the test catalyst. The polymerization response of the test catalyst may be compared to a control catalyst, which is a portion of the test catalyst that is evaluated soon after it is produced.

The accelerated method is used to evaluate the bisamide and non-bisamide catalyst systems separately, and the multimodal catalyst system itself. The accelerated aging method includes the steps of: providing a fresh test catalyst batch; producing a fresh catalyst polymer sample; storing the test catalyst at an elevated temperature to produce aged catalyst; producing an aged catalyst polymer sample; measuring the productivity of each catalyst sample during polymerization, and evaluating the polymer properties of each polymer sample. The elevated temperature is preferably above the highest expected ambient temperature where the commercial catalyst may be stored, and below a deactivation temperature of the catalyst. In one embodiment, the elevated temperature is about 40 to 120° C.; alternatively, the elevated temperature is about 50 to 80° C.; alternatively, the elevated temperature is about 50 to 70° C.; alternatively, the elevated temperature is about 50 to 65° C.; and, alternatively, the elevated temperature is about 55 to 65° C. In a class of embodiments, the elevated temperature is 60° C. In one embodiment, a first test catalyst comprising the bisamide catalyst component is produced, stored, and tested, and a second test catalyst comprising the non-bisamide catalyst component is produced, stored, and tested separately.

In one embodiment of the invention, the accelerated aging method uses High Throughput Polymerization Testing (HTPT) unit comprising a Parallel Polymerization Reactor (PPR), a high temperature rapid GPC station, a Sensory Array Modular Measurement System, and an Automated FT-IR Analysis Station. A preferred HTPT unit is available from Symyx Discovery Tools, Inc. Various test methods and PPRs are also discussed in U.S. publication 2003161763, and PCT publications WO1999064160, WO2001098371, and WO 2000009255, all of which are incorporated herein by reference.

In one embodiment, the method further provides for: determining a first aging characteristic response of the bisamide catalyst system; determining a second aging characteristic response the non-bisamide catalyst system; and combining the first aging characteristic response and the second aging characteristic response to produce the predicted aging characteristic response of the multimodal catalyst system at the given polymerization condition. The first and second aging characteristic responses may be any characteristic responses used to evaluate the polymerization performance of the catalyst, and is preferably the same characteristic response as the predicted aging characteristic response.

In one embodiment, the first aging characteristic response is a catalyst productivity response of the bisamide catalyst system as a function of time, while the second aging characteristic response is a catalyst productivity response of the non-bisamide catalyst system as a function of time. As used herein, the catalyst productivity response refers to the catalyst productivity of a catalyst system at a given set of polymerization conditions, or a catalyst productivity model as a function of polymerization conditions.

In another embodiment, the first aging characteristic response is a first molecular weight distribution response of the bisamide catalyst system after a storage time, while the second aging characteristic response is a second molecular weight distribution response of the non-bisamide catalyst system as a function of time. In yet another embodiment, the first aging characteristic response is a first melt index response of the bisamide catalyst system as a function of time, while the second aging characteristic response is a second melt index response of the non-bisamide catalyst system as a function of time.

In one embodiment of the invention, the first aging characteristic response and the second aging characteristic response are determined using an accelerated aging method to reduce the amount of time the characterization of the response takes. In a further embodiment, the accelerated aging method uses a high throughput polymerization unit to characterize the aging characteristic response.

In order to quantify the "responses" of the aging characteristics, it is preferable to develop models that can be used to predict a product or polymerization property. One of ordinary skill in the art may conduct experiments to quantify the responses of the multimodal catalyst and/or the individual catalyst systems that comprise the multimodal catalyst system. The models may be polynomial mathematical models, that may include various orders of responses. In one embodiment of the invention, a first model of the first aging characteristic response and a second model of the second aging characteristic response are developed based on assumptions of a first order decay or a second order decay. In another embodiment, the predicted aging characteristic response of the multimodal catalyst system is developed based on assumptions of a first order decay or a second order decay.

The catalyst systems are typically placed and/or transported in portable containers or vessels for storage or shipment between the catalyst production facilities and the polymer production facilities. The portable containers or vessels may be simply moved locally within a plant site, or may be shipped by truck, plane, or ship to other plant locations around the world. The portable vessels may be cylinders, drums, DOT approved containers, or any other suitable portable vessel. In order to control the aging of the multimodal catalyst, the portable vessel may be held at controlled temperatures as described herein above. In one embodiment, the portable vessel is held at a controlled temperature by placing the portable vessel in a controlled temperature environment, such as a refrigerated truck or shipping vessel. Alternately, the portable vessel may be provided with any other suitable method of maintaining the interior of the portable vessel at a controlled temperature. Thus, the current invention also provides a method of controlling the aging of any of the multimodal catalyst systems described herein comprising the steps of: providing a multimodal catalyst system comprising a bisamide catalyst system and a non-bisamide catalyst system; and transporting the multimodal catalyst system in a portable vessel, wherein the portable vessel is kept at a controlled temperature of less than about 21° C., preferably the portable vessel is kept at a controlled temperature of less than about 1° C., and more preferably the portable vessel is kept at a controlled temperature of less than about −9° C.

One class of embodiments may also provide a container or vessel comprising the multimodal catalyst system or the catalyst system, wherein the multimodal catalyst system or the catalyst system is maintained at a controlled temperature. In at least one embodiment, the container or vessel may be agitated while in the container or vessel.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

EXAMPLES

In the polymerization tests described in the examples below, the test catalyst is injected into a gas phase test reactor held at 65° C., 225 psig total system pressure, 200 psi ethylene pressure, 0.007 C6/C2 ratio (continuous), and H2/C2 ratio of 0.004 (continuous). Polymerization time was one hour. Standard deviation in runs using duplicate data sets was found to be below 10% and for the triplicate data sets, the standard deviation ranged from 1.8% to 8.2%. The responses of the catalyst systems in Examples 1 to 5 were determined in a batch, gas phase reactor. The flow index values reported in the experiments below are $I_{21}$ flow index values measured according to ASTM D-1238, at 432 psi and 190° C.

In the experiments below, molecular weight distribution (MWD) was characterized using Size-Exclusion Chromatography (SEC). Molecular weight, including weight-average molecular weight (Mw) and number-average molecular weight (Mn), were determined using a High Temperature Size Exclusion (SEC) Chromatograph. Samples were prepared as follows: 7.5 mg of sample is dissolved in 10 ml of 1, 2, and 4 Trichlorobenzene at 160 degree Celsius. Using a heated syringe, sample is placed in an autosampler vial. The instrument conditions were: 300 ul of sample is injected onto 3 Shodex mixed bed columns, a low molecular weight column and a guard column. Column temperature was 140 degrees Celsius. The instrument was a Polymer Laboratories HT-GPC 220. Raw data was acquired through a TriSEc acquisition program and data is processed through an in-house program.

Example 1

To show the effect of aging of a multimodal catalyst system on catalyst productivity, a bimodal catalyst was tested using a dry powder bisamide/non-bisamide catalyst mixture (3.5 mole ratio) that was spray dried. The bisamide was: [(2,3,4,5,6 Me$_5$C$_6$)NCH$_2$CH$_2$]$_2$NHZrBz$_2$ where Bz is a benzyl group as shown below:

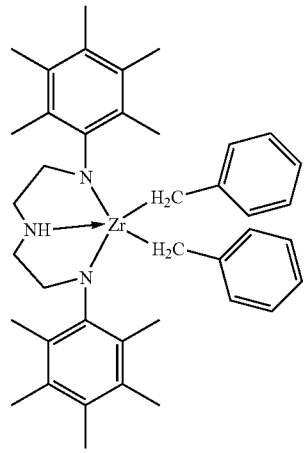

The non-bisamide was a metallocene catalyst, pentamethylcyclopentadienyl(n-propylcyclopentadienyl)ZrCl$_2$ as shown below:

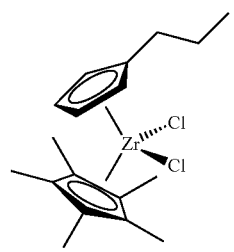

The activator was methylalumoxane. The composition of the spray dried catalyst was: Zr (0.045 mmol/g of catalyst), Al (5.7 mmol/g of catalyst), residual toluene (3.7 wt %), and CaboSil TS610 filler (balance of catalyst). The dry powder catalyst was stored in Hoke bombs kept at 40, 60 and 75° C. The results are given in Table 1 below and FIG. 1 herein. As seen in the figures, temperature accelerates aging considerably. At 75° C., the productivity decreases by 70% in a day; 7% at 60° C. and no drop at 40° C. In a week the decrease in productivity: 77%, 39% and 11% respectively at 75, 60 and 40° C.

TABLE 1

| Aging Time Days | Productivity g/g Storage at 75° C. | Productivity g/g Storage at 60° C. | Productivity g/g Storage at 40° C. | % Drop in Productivity At 75° C. | % Drop in Productivity At 60° C. | % Drop in Productivity At 40° C. |
|---|---|---|---|---|---|---|
| 0 | 5400 | 5400 | 5400 | | | |
| 1 | 1554 | 5030 | 5400 | −71 | −7 | 0 |
| 2 | 1280 | 4925 | 5080 | −76 | −9 | −6 |
| 3 | | 4264 | | | −21 | |
| 4 | | 4216 | | | −22 | |
| 5 | 1231 | | | −77 | | |
| 7 | | 3293 | 4830 | | −39 | −11 |
| 9 | | | 4750 | | | −12 |
| 15 | | 2920 | 4750 | | −46 | −12 |
| 23 | | | 4480 | | −51 | −17 |
| 30 | | | 3840 | | | −29 |
| 51 | | | 3830 | | | −29 |

Example 2

Figure 2:
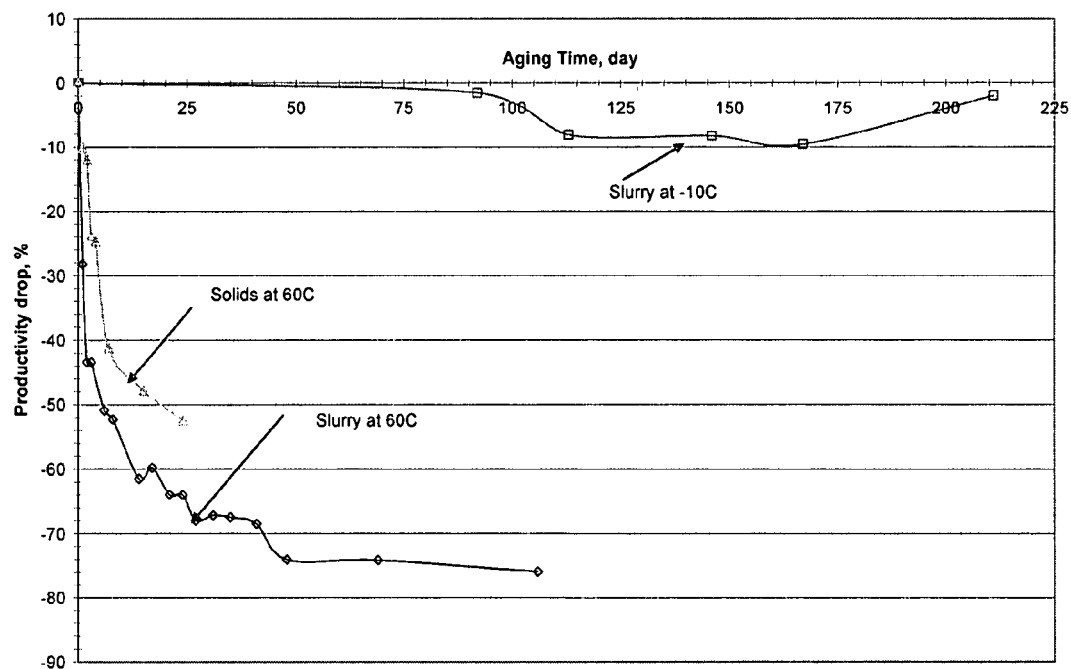
FIG. 2 is a graph showing the change in the productivity over time of a multimodal catalyst powder and a multimodal catalyst slurry stored at various temperatures, and at a controlled temperature of the current invention.

The productivity of the same bimodal catalyst described above was studied when stored at controlled cooler temperature conditions and at warmer temperature conditions. A dry powder system and a slurried catalyst system composed of 22 wt % solids, 10 wt % hexane and 68 wt % mineral oil (Hydrobrite 380) were tested. Accelerated aging studies were carried out at 60° C. The results are presented in Table 2 and FIG. 2. It can be seen that the slurry ages more than the solids. The slurry loses 28% productivity after one day and about 50% in a week at this temperature. In comparison, solids lose 10% in a day and 40% in a week.

A representative slurry was then stored inside a freezer at −10° C. and aging was measured for about 7 month period. Aging was indeed retarded and there was a small amount of loss in productivity in the first three months and about 10% loss in the next three months. The slurry stored at −10° C. is also compared with solids and slurry stored at 60° C. in FIG. 2. In 3 months of cold storage at −10° C., the catalyst system in the slurry generally maintained its productivity, whereas at 60° C. it lost almost 75% of its activity.

| Bimodal Catalyst Aging - Powder and Slurry −50 micromol Zr/g loaded ||||||||
|---|---|---|---|---|---|---|---|
| Powder @ 60° C. | | | Slurry @ 60° C. | | | Slurry @ −10° C. | | |
| # Days Stored | Productivity Gr./Gr. | Change % | # Days Stored | Productivity Gr./Gr. | Change % | # Days Stored | Productivity Gr./Gr. | Change % |
| 0 | 5600 | | 0 | 5336 | | 0 | 5336 | |
| 1 | 5031 | −10.2 | 1 | 3830 | −28.2 | 92 | 5255 | −1.5 |
| 2 | 4925 | −12.1 | 2 | 3020 | −43.4 | 113 | 4905 | −8.1 |
| 3 | 4264 | −23.9 | 3 | 3019 | −43.4 | 146 | 4896 | −8.2 |
| 4 | 4216 | −24.7 | 6 | 2621 | −50.9 | 167 | 4825 | −9.6 |
| 7 | 3293 | −41.2 | 8 | 2546 | −52.3 | 211 | 5230 | −2.0 |
| 15 | 2921 | −47.8 | 14 | 2053 | −61.5 | | | |
| 24 | 2664 | −52.4 | 17 | 2144 | −59.8 | Avg. | 5075 | |
| | | | 21 | 1923 | −64.0 | S. Dev. | 223 | 4.4 |
| | | | 24 | 1922 | −64.0 | | | |
| | | | 27 | 1710 | −68.0 | | | |
| | | | 31 | 1754 | −67.1 | | | |
| | | | 35 | 1736 | −67.5 | | | |
| | | | 41 | 1682 | −68.5 | | | |
| | | | 48 | 1388 | −74.0 | | | |
| | | | 69 | 1383 | −14.1 | | | |
| | | | 106 | 1286 | −75.9 | | | |

Example 3

Figure 3:
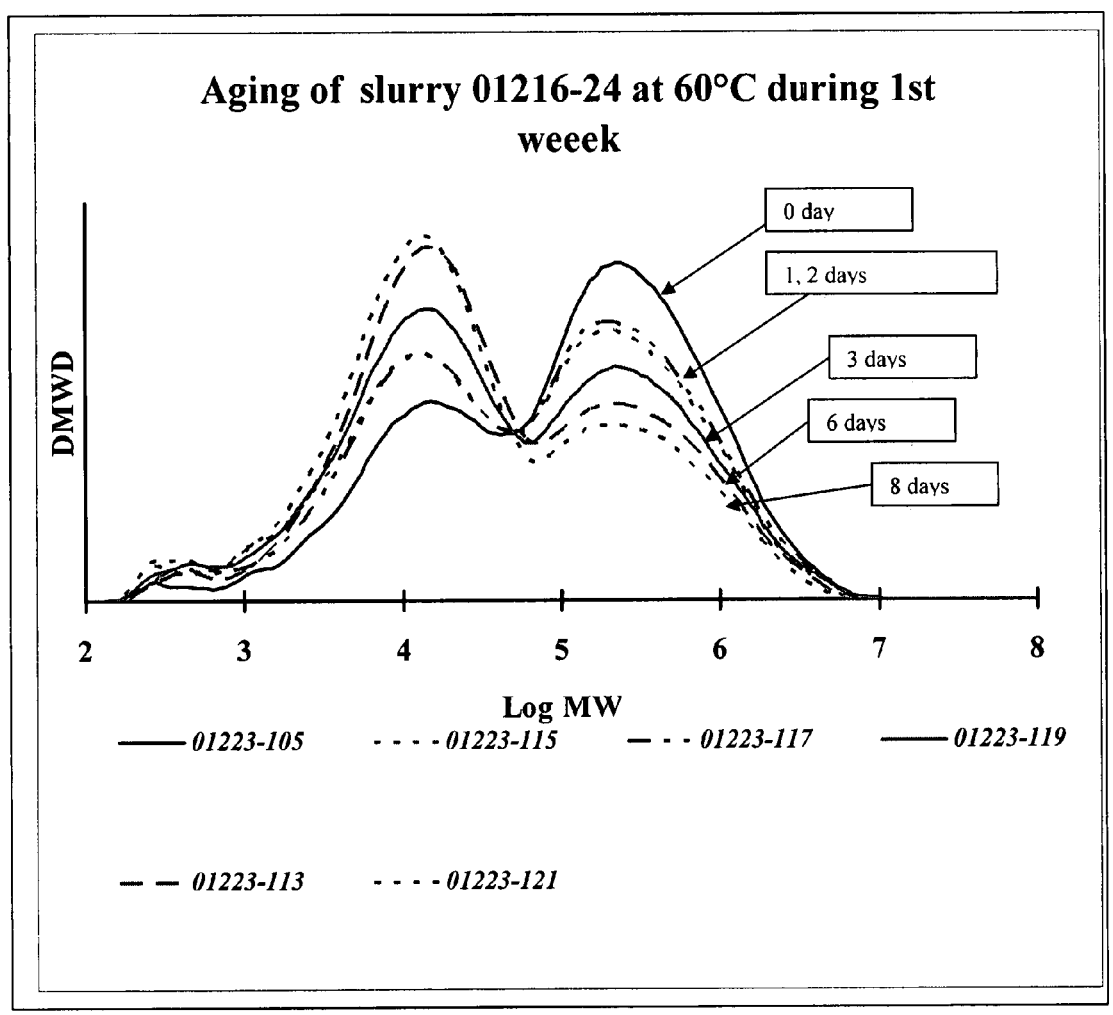
FIG. 3 is a graph showing the change in molecular weight distribution of polymer produced using a multimodal catalyst aged using an accelerated aging method.

The effect of catalyst aging on molecular weight was studied at an accelerated condition of 60° C. using the same bimodal catalyst described in Example 1. Polymer product was produced using the same bimodal catalyst batch that was fresh, and aged over periods of days at 60° C. The results obtained are given in Table 3 and FIG. 3. Aging progressively increased the size of the low molecular weight peak and decreased the size of the HMW peak. Also note that the FI increased by aging.

TABLE 3

Bimodal Catalyst Slurry Aging At 60° C.
Molecular Weight Distribution

| | Days | | | | | |
|---|---|---|---|---|---|---|
| | 0 | 1 | 2 | 3 | 6 | 8 |
| Exp. Mn | 10,970 | 6,056 | 7,806 | 6,148 | 6,939 | 5,060 |
| Exp. Mw | 366,772 | 279,026 | 318,694 | 279,142 | 232,457 | 196,863 |
| Exp. Mw/Mn | 33.43 | 46.07 | 40.83 | 45.41 | 33.50 | 38.91 |
| Calc. Mn | 11,489 | 5,432 | 6,947 | 5,432 | 5,949 | 4,438 |
| Calc. Mw | 365,259 | 277,641 | 314,455 | 278,835 | 229,596 | 195,027 |
| Calc. Mw/Mn | 31.79 | 51.11 | 45.27 | 51.33 | 38.60 | 43.94 |
| LMW Mn | 3,751 | 2,380 | 2,898 | 2,770 | 3,121 | 2,649 |
| LMW Mw | 13,860 | 12,012 | 12,814 | 13,536 | 12,824 | 12,537 |
| LMW Mw/Mn | 3.70 | 5.05 | 4.42 | 4.89 | 4.11 | 4.73 |
| LMW Wt % | 30.53 | 42.54 | 40.18 | 49.80 | 50.04 | 58.35 |
| HMW Mn | 123,107 | 108,327 | 112,578 | 116,726 | 64,245 | 82,538 |
| HMW Mw | 519,691 | 474,334 | 517,073 | 542,042 | 446,678 | 450,640 |
| HMW Mw/Mn | 4.22 | 4.38 | 4.59 | 4.64 | 6.95 | 5.46 |
| HMW Wt % | 69.47 | 57.46 | 59.82 | 50.20 | 49.96 | 41.65 |
| Sum Err^2 | 4.644E-6 | 5.528E-6 | 2.360E-6 | 3.636E-6 | 5.606E-6 | 9.083E-6 |
| FI | 3.47 | 4.76 | 4.25 | 5.82 | 13.23 | 24.86 |

In Tables 3 and 4:
Exp. Mn is the experimental number average molecular weight;
Exp. Mw is the experimental weight average molecular weight;
Exp. Mw/Mn is the experimental weight average molecular weight divided by the experimental number average molecular weight;
Calc. Mn is the calculated number average molecular weight;
Calc. Mw is the calculated weight average molecular weight;
Calc Mw/Mn is the calculated weight average molecular weight divided by the calculated number average molecular weight;
LMW Mn is the measured low molecular weight component number average molecular weight;
LMW Mw is the measured low molecular weight component weight average molecular weight;
LMW Mw/Mn is the low molecular weight component measured weight average molecular weight divided by the measured number average molecular weight;
LMW Wt % is the weight percent of the low molecular weight component in the polymer sample;
HMW Mn is the measured high molecular weight component number average molecular weight;
HMW Mw is the measured high molecular weight component weight average molecular weight;
HMW Mw/Mn is the high molecular weight component measured weight average molecular weight divided by the measured number average molecular weight;
HMW Wt % is the weight percent of the high molecular weight component in the polymer sample;
Sum Err^2 is the sum of the error squared; and
FI is $I_{21}$ flow index.

Example 4

Figure 4:
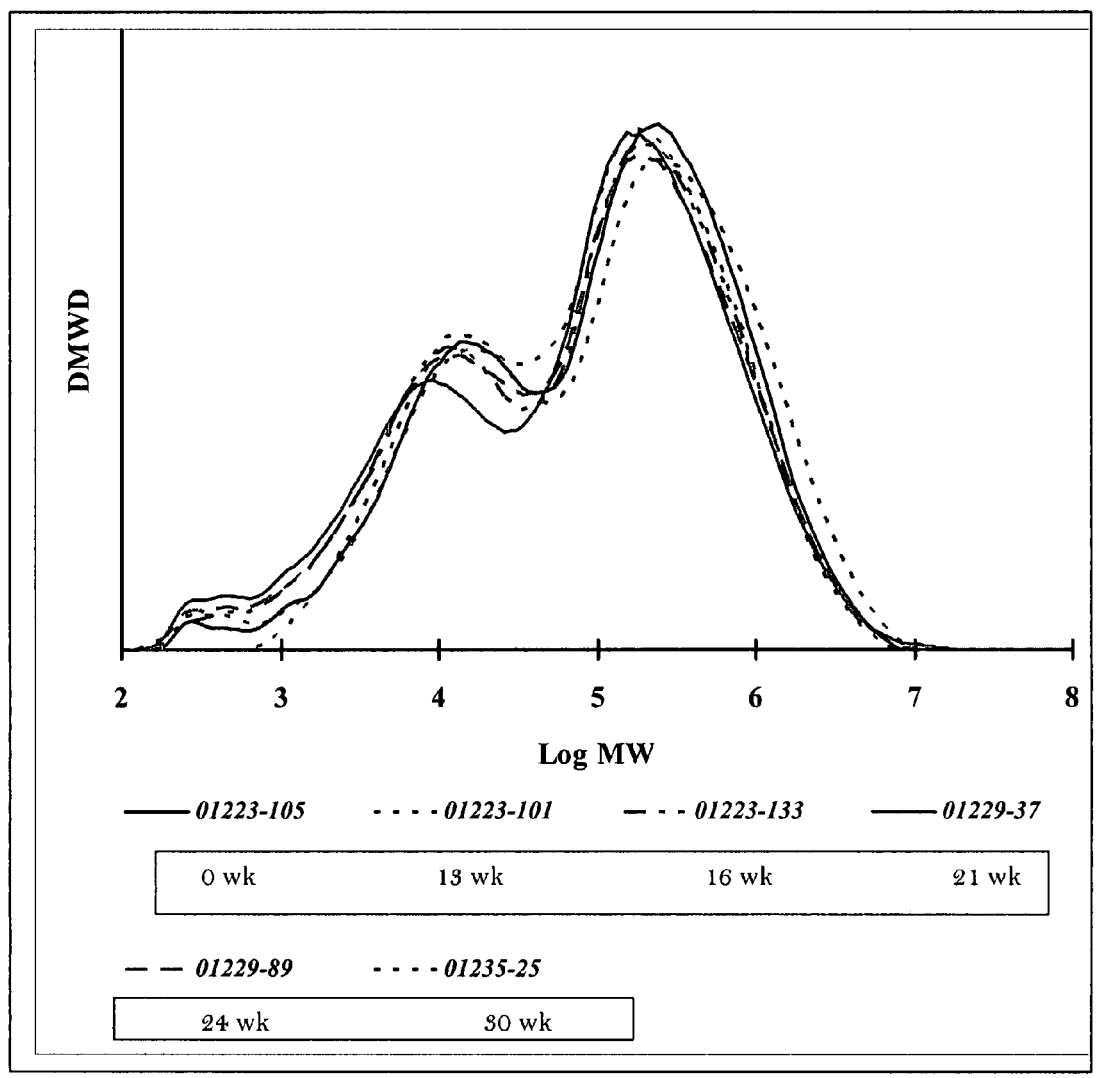
FIG. 4 is a graph showing the molecular weight distribution of polymer produced using a multimodal catalyst stored at a controlled temperature of the current invention.

The positive aspect of aging control and the effect on molecular weight distribution was substantiated by SEC on the polymer obtained using the same catalyst as used in Example 3 and stored at −10° C. The molecular weight distribution found in the polymer produced over a 30 week period is shown in Table 4 and FIG. 4. The variation in HMW, FI and HMW split are within the expected variability in the measurements. In FIG. 4, one can see the peaks overlap upon each other during 30 weeks of cold storage. Thus, the storage at −10° C. does not alter the modality and hence the polymer product properties.

TABLE 4

Bimodal Catalyst Slurry Aging At −10° C.

| # weeks @ −10° C. | Productivity Gr./Gr. | Change | FI | HMW Mw | HMW wt % | LMW Mw | LMW wt % |
|---|---|---|---|---|---|---|---|
| 0 | 5336 | | | | | | |
| 13 | 5255 | −1.5 | 5.33 | 454,521 | 71.0 | 12,823 | 29.0 |
| 16 | 4905 | −8.1 | | 484,321 | 67.4 | 11,314 | 32.6 |
| 21 | 4896 | −8.2 | | 471,091 | 69.1 | 8,977 | 30.9 |
| 24 | 4825 | −9.6 | 5.41 | 491,360 | 67.1 | 11,247 | 32.9 |
| 30 | 5230 | −2.0 | 4.41 | 645,006 | 68.4 | 15,204 | 31.58 |

Example 5

Aging of a multimodal catalyst system described in the examples above were conducted at 40, 60 and 75° C. To explore how well the traditional single site kinetic models explain the aging behavior at these temperatures, first and second order decays were tested. The kinetic constants were obtained by linear plots. Data for activation energy graphs were taken from the kinetic constants and tabulated for Arrhenius plot. Using the activation energy, the kinetic constants were calculated and productivity at various storage time was calculated from the respective kinetic expressions. Experimental data at 40, 60, and 75° C. was compared to the various model predictions. It was found that: models do not predict well at 75° C.; first and second order are useful only for a short duration of a week's time at 60° C.; both first and second orders did a reasonable job at 40° C. during the 50 day testing period. Out of the two models, first order decay is simpler and can be used for first approximation of aging at 40° C. The first order model is as follows:

$$P/P0 = \mathrm{Exp}(-k*t)$$

where P and P0 are productivity at times t and 0 respectively; k is rate constant at temperature T, and t is storage time in days $$LN(k) = (-13859/T + 38.988)$$

where

T = storage temperature in °K.

$$\% \text{ drop in productivity} = (P/P0 - 1)*100$$
$$= \{[\exp(-k*t)] - 1\}*100$$

The simple expression for aging of the tested bimodal catalyst at 40° C. was found to be:

% drop in productivity=−0.4566*storage time in days.

Comparison of the first order model and experimental results is shown in Table 5.

TABLE 5

First Order Decay Model

| Aging Time Days | % Drop in Productivity Measured | % Drop in Productivity First Order Model |
|---|---|---|
| 1 | 0 | −.05 |
| 2 | −6 | −1 |
| 7 | −11 | −3.5 |
| 9 | −12 | −4.4 |
| 15 | −12 | −7.3 |
| 23 | −17 | −10.9 |
| 30 | −29 | −14 |
| 51 | −29 | −22.7 |

Example 6

Tests were conducted on the bisamide and non-bisamide catalyst systems separately to evaluate the thermal stability of the two catalyst systems comprising the selected bimodal catalyst system. Oil slurries of these two catalysts (spray dried) were heated at 60° C. for several days, followed by an ethylene/hexene copolymer run on an HTPT unit.

Polymerizations were performed using a HTPT in a glass-lined 5-milliliter autoclave reactor equipped with a mechanical stirrer. The reactor was dried and degassed thoroughly at 115° C. The diluent, comonomer, and scavenger, were added at room temperature and atmospheric pressure. The reactor was then brought to process pressure and charged with ethylene while stirring at 800 RPM. The catalyst system was added via syringe with the reactor at process conditions. The polymerization was continued while maintaining the reaction vessel within 2° C. of the target process temperature and 2 psig of target process pressure (by automatic addition of ethylene on demand) until a fixed uptake of ethylene was noted (corresponding to ca. 0.15 g polymer) or until a maximum reaction time had passed. The reaction was stopped and the polymer was recovered by vacuum centrifugation of the reaction mixture. Bulk polymerization activity was calculated by dividing the yield of polymer by the total weight of the catalyst charge by the time in hours and by the absolute monomer pressure in atmospheres. The polymerization productivity was calculated by dividing the yield of polymer by the grams of catalyst charge by the time in hours.

The HTPT unit is useful for testing single catalyst, however, running multimodal catalyst in the PPR of the HTPT afforded monomodal product with relatively high Mw for catalyst formulations where in the bisamide/non-bisamide ratio was >1.0. Without being bound to theory, it is believed that this is due, at least in part, to the dramatically different kinetic profiles of the selected bisamide and non-bisamide catalyst systems. As can be seen from Table 6, the drop in productivity of the bisamide catalyst system was nearly 47%, whereas the drop in catalyst productivity of the non-bisamide catalyst system was only 20%. Thus, the HTPT testing is capable of predicting the effect of catalyst aging on multimodal catalyst components individually.

TABLE 6

Catalyst Productivity Response for Bimodal Catalyst Components

| | Catalyst Productivity Gr/Gr | |
|---|---|---|
| Days @ 60° C. | Non-bisamide Cat. System | Bisamide Cat. System |
| 0 | 2,400 | 16,500 |
| 1 | 2,350 | 12,000 |
| 2 | 2,125 | 11,500 |
| 3 | 1,925 | 8,750 |

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:
1. A method of polymerizing olefins comprising:
(a) providing a multimodal catalyst system;
(b) storing the multimodal catalyst system at a controlled temperature, wherein the controlled temperature is less than 1° C.;

(c) contacting the multimodal catalyst system with a monomer selected from the group consisting of $C_2$ to $C_4$ alpha olefins in a polymerization process; and (d) producing a multimodal polymer.

2. The method of claim 1, wherein the multimodal catalyst system comprises a bisamide catalyst system and a non-bisamide catalyst system.

3. The method of claim 2, wherein the bisamide catalyst system comprises a Group 15 containing metal catalyst compound.

4. The method of claim 3, wherein the bisamide catalyst system comprises a metal catalyst compound comprising a group 3 to 14 metal atom bound to at least one anionic leaving group and also bound to at least two group 15 atoms, at least one of which is also bound to a group 15 or 16 atom through another group which may be a $C_1$ to $C_{20}$ hydrocarbon group, a heteroatom containing group, silicon, germanium, tin, lead, phosphorus, or a halogen, wherein the group 15 or 16 atom may also be bound to nothing or a hydrogen, a group 14 atom containing group, a halogen, or a heteroatom containing group, and wherein each of the two group 15 atoms are also bound to a cyclic group and may optionally be bound to hydrogen, a halogen, a heteroatom or a hydrocarbyl group, or a heteroatom containing group.

5. The method of claim 2, wherein the non-bisamide catalyst system comprises a metallocene catalyst system or a conventional transition metal catalyst system.

6. The method of claim 1, wherein the multimodal catalyst system comprises a spray dried catalyst mixture, wherein the spray dried catalyst mixture comprises a bisamide catalyst compound, a metallocene catalyst compound, an activator, and a residual solvent.

7. The method of claim 6, wherein the spray dried catalyst mixture comprises 1 to 3 wt % of the bisamide catalyst compound and the metallocene compound combined.

8. The method of claim 6, wherein the spray dried catalyst mixture comprises 30 to 50 wt % of the activator.

9. The method of claim 6, wherein the spray dried catalyst mixture comprises 50 to 70 wt % of the silica filler and 2 to 4 wt % of the residual solvent.

10. The method of claim 6, wherein the spray dried catalyst mixture is dispersed in a liquid to form a slurried catalyst mixture, and wherein the liquid comprises an oil and a $C_6$ or higher alkane.

11. The method of claim 10, wherein the $C_6$ or higher alkane is hexane or a high-purity isoparaffinic solvent having an ASTM D 86 boiling point above 97° C.

12. The method of claim 10, wherein the slurried catalyst mixture comprises 15 to 30 wt % of the spray dried catalyst mixture.

13. The method of claim 10, wherein the slurried catalyst mixture comprises 60 to 70 wt % of the oil and less than 20 wt % of the $C_6$ or higher alkane.

14. The method of claim 1, wherein the controlled temperature is less than −9° C.

15. The method of claim 1, wherein the multimodal catalyst is stored for at least 30 days.

16. The method of claim 1, wherein:
(a) the contacting step is conducted at a temperature of greater than 60° C. and a pressure of from 200 psig to 400 psig; and
(b) an aged catalyst productivity is at least 75% of a fresh catalyst productivity.

17. The method of claim 1, wherein a high molecular weight fraction of an aged catalyst polymer produced in the contacting step is at least 85% of the high molecular weight fraction of a fresh catalyst polymer.

18. The method of claim 1, further comprising the steps of:
a) warming the multimodal catalyst system after storing the multimodal catalyst system at the controlled temperature; and
b) agitating the multimodal catalyst system before contacting the multimodal catalyst system with the monomer.

19. The method of claim 18, wherein the multimodal catalyst system is agitated after warming the multimodal catalyst system.

20. The method of claim 18, wherein the multimodal catalyst system is warmed to at least about 10° C. before agitating the multimodal catalyst system.

21. The method of claim 18, wherein the multimodal catalyst system is agitated for at least about 24 hours.

22. The method of claim 1, wherein the multimodal catalyst is stored for at least 60 days.

23. The method of claim 1, wherein the multimodal catalyst is stored for at least 100 days.

24. The method of claim 1, wherein:
(a) the contacting step is conducted at a temperature of greater than 60° C. and a pressure of from 200 psig to 400 psig; and
(b) an aged catalyst productivity is at least 85% of a fresh catalyst productivity.

25. The method of claim 1, wherein:
(a) the contacting step is conducted at a temperature of greater than 60° C. and a pressure of from 200 psig to 400 psig; and
(b) an aged catalyst productivity is at least 90% of a fresh catalyst productivity.

26. The method of claim 1, wherein a high molecular weight fraction of an aged catalyst polymer produced in the contacting step is at least 90% of the high molecular weight fraction of a fresh catalyst polymer.

\* \* \* \* \*